(12) United States Patent
Li et al.

(10) Patent No.: US 10,156,925 B2
(45) Date of Patent: Dec. 18, 2018

(54) ARRAY SUBSTRATE, METHOD FOR FABRICATING THE SAME, AND DISPLAY APPARATUS

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Yungang Sun, Shanghai (CN); Kang Yang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 31 days.

(21) Appl. No.: 14/930,518

(22) Filed: Nov. 2, 2015

(65) Prior Publication Data
US 2016/0291776 A1    Oct. 6, 2016

(30) Foreign Application Priority Data

Apr. 1, 2015  (CN) .......................... 2015 1 0152668

(51) Int. Cl.
| | | |
|---|---|---|
| *G06F 3/041* | (2006.01) | |
| *G06F 3/044* | (2006.01) | |
| *G02F 1/1362* | (2006.01) | |
| *G02F 1/1333* | (2006.01) | |

(52) U.S. Cl.
CPC ............ *G06F 3/0416* (2013.01); *G06F 3/044* (2013.01); *G06F 3/0412* (2013.01); *G02F 1/13338* (2013.01); *G02F 2001/13629* (2013.01); *G06F 2203/04103* (2013.01)

(58) Field of Classification Search
CPC ......... G06F 3/0416; G06F 2203/04111; G06F 2203/04103
See application file for complete search history.

(56) References Cited

U.S. PATENT DOCUMENTS

| | | | |
|---|---|---|---|
| 2006/0164352 A1* | 7/2006 | Yoo ..................... | G02F 1/13624 345/87 |
| 2008/0068524 A1* | 3/2008 | Kim .................. | G02F 1/136286 349/38 |
| 2009/0179868 A1* | 7/2009 | Ayres .................... | G06F 3/0412 345/173 |

(Continued)

*Primary Examiner* — Nitin Patel
*Assistant Examiner* — Robert M Stone
(74) *Attorney, Agent, or Firm* — Alston & Bird LLP

(57) ABSTRACT

An array substrate, a method for fabricating the same and a display apparatus are provided. The array substrate includes first non-display areas and second non-display areas, where the first non-display areas and the second non-display areas are respectively areas between adjacent columns of the pixel units and are arranged alternately in the first direction; two data lines are disposed in each first non-display area, the two data lines are electrically connected to two columns of pixel units on two sides of the first non-display area where the two data lines are located; a gap is provided between two electrode units adjacent in the first direction, and the gap is located above a part of the second non-display area.

13 Claims, 6 Drawing Sheets

(56) References Cited

U.S. PATENT DOCUMENTS

| | | | |
|---|---|---|---|
| 2012/0013814 A1* | 1/2012 | Woo | G02F 1/134336 349/33 |
| 2013/0257794 A1* | 10/2013 | Lee | G06F 3/041 345/174 |
| 2014/0085222 A1* | 3/2014 | Park | G06F 3/0412 345/173 |
| 2014/0118277 A1* | 5/2014 | Kim | G06F 3/044 345/173 |
| 2014/0125626 A1 | 5/2014 | Yang et al. | |
| 2014/0168154 A1* | 6/2014 | Wang | G06F 3/0412 345/174 |
| 2014/0285465 A1* | 9/2014 | Hayashi | G06F 3/044 345/174 |
| 2015/0002421 A1 | 1/2015 | Kim et al. | |
| 2015/0268774 A1* | 9/2015 | Xu | G02F 1/13338 345/173 |
| 2015/0309634 A1* | 10/2015 | Lee | G06F 3/0412 345/173 |
| 2015/0378486 A1* | 12/2015 | Yu | G06F 3/0412 345/174 |

* cited by examiner

ARRAY SUBSTRATE, METHOD FOR FABRICATING THE SAME, AND DISPLAY APPARATUS

CROSS REFERENCE TO RELATED APPLICATIONS

The present application claims the priority to Chinese Patent Application No. 201510152668.2, entitled "ARRAY SUBSTRATE, METHOD FOR FABRICATING THE SAME, AND DISPLAY APPARATUS", filed on Apr. 1, 2015 with the State Intellectual Property Office of the Peoples Republic of China, which is incorporated herein by reference in its entirety.

FIELD OF THE INVENTION

The disclosure relates to the field of display technology, and in particular, to an array substrate, a method for fabricating the array substrate, and a display apparatus.

BACKGROUND OF THE INVENTION

As an input medium, a touch screen is an easy, convenient and natural device for human-computer interaction. Increasingly, it has become a research and development focus for flat panel display manufacturers to integrate a touch function into a liquid crystal display (LCD) or an organic light-emitting diode (OLED) display.

In order to further reduce the volume of a touch screen of a mobile terminal, an in cell touch display panel (in cell TP) was developed. For the in cell TP, touch electrodes are integrated into a liquid crystal display panel. Therefore, a touch screen adopting the in cell touch display technology may have a smaller size than a touch screen adopting the one glass solution (OGS).

In the conventional in cell TP, a common electrode in a pixel area further serves as touch electrodes, and the volume of the in cell TP can be reduced. However, the technology may result in light leakage of the liquid crystal display panel, thereby reducing a display effect of the liquid crystal display panel.

BRIEF SUMMARY OF THE INVENTION

The present disclosure provides an array substrate, a method for fabricating the array substrate and a display apparatus, to solve a problem of light leakage of a display panel integrated with a touch function.

An array substrate is provided in the present disclosure, which includes:
a first substrate;
a pixel array located on the first substrate, where the pixel array includes multiple pixel units arranged in an array;
multiple scanning lines each extended in a first direction and multiple data lines each extended in a second direction, where the scanning lines and the data lines are used to drive the pixel units;
first non-display areas and second non-display areas, where one first non-display area or one second non-display area is located between two adjacent columns of the pixel units, the first non-display areas and the second non-display areas are arranged alternately in the first direction, two data lines are disposed in each of the first non-display areas, and the two data lines are respectively electrically connected to two columns of pixel units on two sides of the first non-display area where the two data lines are located; and
a common electrode layer disposed opposite to the pixel array, wherein the common electrode layer comprises multiple electrode units arranged in an array, the multiple electrode units function as touch sensing electrodes in a touch sensing phase and function as common electrodes of the pixel units in a display phase, a gap is provided between two electrode units adjacent in the first direction, and the gap is located above a part of the second non-display area.

The array substrate according to the present disclosure includes first non-display areas and second non-display areas which are located between adjacent columns of the pixel units and are arranged alternately in the first direction, two data lines are disposed in each of the first non-display areas, the two data lines are respectively electrically connected to two columns of pixel units on two sides of the first non-display area where the two data line are located; a gap is provided between two electrode units adjacent in the first direction, and the gap is located above a part of the second non-display area. Since the data lines are disposed in the first non-display areas and the gap between electrode units is not located above the first non-display area, no lateral electric field may be generated above the electrode unit by the data lines and the electrode units, thereby avoiding light leakage due to the lateral electric field. There is no data line in the second non-display area below the gap between two adjacent electrode units, thereby avoiding light leakage at the gap between two adjacent electrode units due to the data lines.

A method for fabricating an array substrate is further provided according to the present disclosure, which includes:
providing a first substrate; and
forming, on the first substrate, a pixel array, multiple scanning lines each extended in a first direction, multiple data lines each extended in a second direction and a common electrode layer, where the pixel array includes multiple pixel units arranged in an array, the scanning lines and the data lines are used to drive the multiple pixel units, an area located between two adjacent columns of the pixel units is a first non-display area or a second non-display area, and the first non-display areas and the second non-display areas are arranged alternately in the first direction;
where in a process of forming the multiple data lines, multiple data lines are formed in pairs on the first substrate; and after the pixel array, the scanning lines and the data lines are formed, the data lines are disposed in the first non-display areas, each of the first non-display areas includes two adjacent data lines, and the two adjacent data lines are respectively electrically connected to two columns of pixel units on two sides of the first non-display area where the two adjacent data lines are located; and
the common electrode layer is disposed opposite to the pixel array, the common electrode layer includes multiple electrode units arranged in an array, the electrode units function as touch sensing electrodes in a touch sensing phase and function as common electrodes of the pixel units in a display phase, a gap is provided between two electrode units adjacent in the first direction, and the gap is located above a part of the second non-display area.

With the array substrate fabricated using the fabricating method, light leakage at the gap between two adjacent electrode units due to the data lines can be avoided.

A display apparatus is further provided according to the present disclosure, which includes: the array substrate according to the present disclosure; and a cover plate disposed opposite to the array substrate. As compared with the conventional art, a better display effect can be obtained by the display apparatus according to the present disclosure, since light leakage at the gap between two adjacent electrode units due to the data lines is avoided with the array substrate according to the present disclosure.

DETAILED DESCRIPTION OF THE INVENTION

As described in the background, in the conventional in cell TP, a common electrode in a pixel area further serves as touch electrodes, and a volume of the in cell TP can be reduced. However, this technology may result in light leakage of the in cell TP. Specifically, reference is made to FIG. 1, which shows a schematic diagram of an in cell TP. A common electrode is disposed on an array substrate 10 of a liquid crystal display panel, for providing a common potential for pixel units (not shown in FIG. 1). In order to integrate touch function into the liquid crystal display panel, the common electrode is divided into multiple touch electrode units 12 independent from each other, and each of the touch electrode units 12 is connected, to a touch display chip 11 disposed on the array substrate 10, via a touch electrode lead 13. Operation time of the liquid crystal display panel includes a display phase and a touch sensing phase. In the display phase, the touch display chip 11 transmits a touch sensing signal to the respective touch electrode units 12. In the touch sensing phase, the touch display chip 11 transmits a same common signal to all of the touch electrode units 12.

Figure 1:
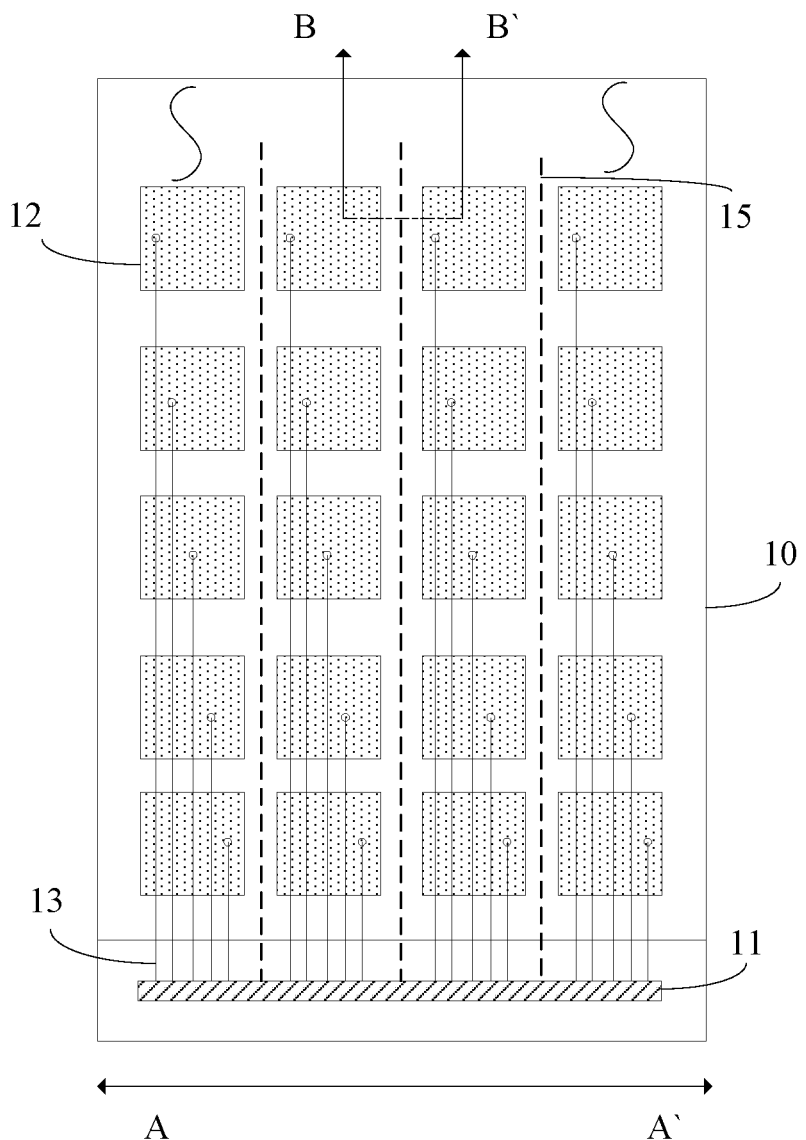
FIG. 1 is a schematic diagram of an exemplary in cell TP.

As shown in FIG. 1, in the in cell TP, gaps between adjacent touch electrode units 12 are generally disposed in non-display areas outside the pixel units, since the touch electrode units 12 are configured to provide the common signal to the pixel units to display an image. Data lines 15 are disposed in the non-display areas between touch electrode units 12 adjacent in a transverse direction (in a direction indicated by line AA').

Figure 2:
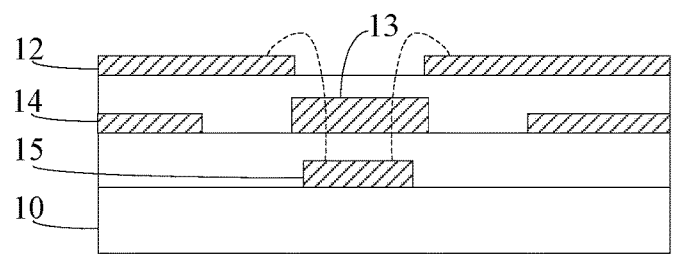
FIG. 2 is a sectional view along a line BB' in FIG. 1.

FIG. 2 shows a sectional view along line BB' in FIG. 1. Pixel electrodes 14 of the pixel units are disposed below the touch electrode units 12, and a fringe field is formed between the touch electrode units 12 and the pixel electrodes 14 to drive liquid crystal molecules to rotate, that is, FIG. 1 and FIG. 2 show an array substrate of a liquid crystal display panel in a fringe field switching (FFS) mode. It can be seen in conjunction with FIG. 1 and FIG. 2 that, gaps between touch electrode units 12 adjacent in the lateral direction (in the direction indicated by the line AA') are respectively located over the data lines 15. In the case that a driving potential is applied to the data lines 15, a lateral electric field may be generated between the data lines 15 and the touch electrode units 12 to which the common potential is applied, such that the liquid crystal molecules in the non-display areas corresponding to the data lines 15 are rotated, thereby resulting in light leakage of pixel units on both sides of the non-display areas. In order to reduce light leakage, conventionally, one touch electrode lead 13 is generally disposed above each data line 15 to shield the lateral electric field between the data lines 15 and the touch electrode units 12. However, since it is hard to arrange the touch electrode leads 13 and the touch electrode units 12 at proper positions during a fabricating process, a risk of light leakage still exists.

In view of the above, a touch display panel is provided according to the present disclosure.

The touch display panel includes:

a first substrate;

a pixel array located on the first substrate, where the pixel array includes multiple pixel units arranged in an array;

multiple scanning lines each extended in a first direction and multiple data lines each extended in a second direction, where the scanning lines and the data lines are used to drive the pixel units;

first non-display areas and second non-display areas, where one first non-display area or one second non-display area is located between two adjacent columns of pixel units, the first non-display areas and the second non-display areas are arranged alternately in the first direction, two data lines are disposed in each of the first non-display areas, the two data lines are respectively electrically connected to two columns of pixel units on two sides of the first non-display area where the two data lines locate; and a common electrode layer disposed opposite to the pixel array, where the common electrode layer includes multiple electrode units arranged in an array, the electrode units function as touch sensing electrodes in a touch sensing phase and function as common electrodes of the respective pixel units in a display phase, one gap is defined between any two electrode units adjacent in the first direction, and each gap is located over a part of the second non-display area.

Since the data lines are disposed in the first non-display areas, and the gaps between the electrode units are not located above the first non-display areas, no lateral electric field may be generated above the electrode units due to the data lines and the electrode units, thereby avoiding light leakage due to the lateral electric field; and the data lines are not provided in the second non-display areas below the gaps between adjacent electrode units, thereby avoiding light leakage at the gap between two adjacent electrode units due to the data line.

To make the above features and advantages of the disclosure more apparent and easier to be understood, hereinafter specific embodiments of the disclosure are illustrated in detail in conjunction with the drawings.

Figure 3:
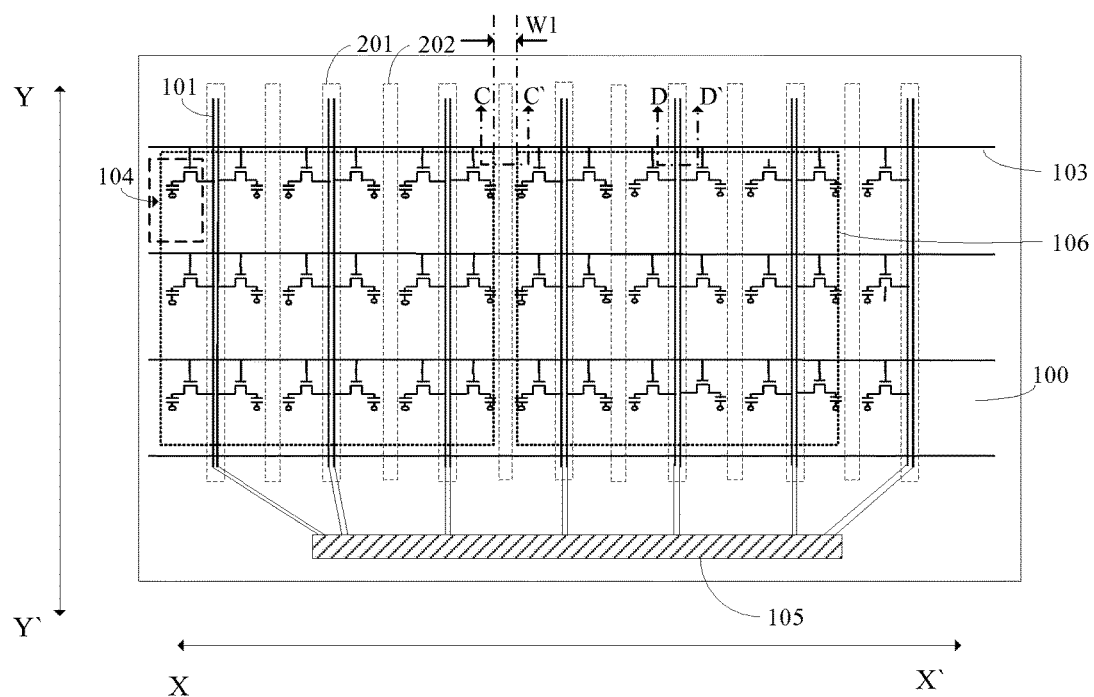
FIG. 3 is a schematic diagram of an array substrate according to the present disclosure.

Reference is made to FIG. 3, which shows a schematic diagram of an array substrate according to a first embodiment of the present disclosure. The array substrate according to the embodiment includes:

a first substrate 100; where in the embodiment, the first substrate 100 is a glass substrate, but the material of the first substrate 100 is not limited in the present disclosure;

a pixel array disposed on the first substrate 100; where the pixel array includes multiple pixel units 104 arranged in an array; it should be noted that, each of the multiple pixel units 104 includes a thin film transistor having a gate, a source and a drain, and a pixel electrode and the like; for sake of clarity, an area where the pixel unit is located is shown merely by an area surrounded by a dotted line, and the thin film transistor and the pixel electrode in each of the pixel units are shown by a conventional schematic diagram in the field;

multiple scanning lines 103 each extended in a first direction (in a direction along a line XX') and multiple data lines 101 each extended in a second direction (in a direction along a line YY'); where the scanning lines 103 and the data lines 101 are used to drive the pixel units, and it should be noted that, in the embodiment, the first direction is perpendicular to the second direction, which is not limited in the present disclosure;

first non-display areas 201 and second non-display areas 202; where the area between two adjacent columns of the pixel units 104 is one first non-display area 201 or one second non-display area 202, and the first non-display areas 201 and the second non-display areas 202 are arranged alternately in the first direction; two data lines 101 are disposed in each of the first non-display areas 201, and the two data lines 101 are respectively electrically connected to two columns of pixel units 104 on two sides of the first non-display area where the two data lines are located; and a common electrode layer; where the common electrode layer is disposed opposite to the pixel array, and the common electrode layer includes multiple electrode units 106 arranged in an array; the electrode units 106 function as touch sensing electrodes in a touch sensing phase and function as common electrodes of the pixel units in a display phase; a gap W1 is defined between two electrode units 106 adjacent in the first direction, and the gap W1 is located above a part of the second non-display area 202.

It should be noted that, in the embodiment, the common electrode layer is disposed above a side of the pixel array, the side being away from the first substrate 100; that is, the electrode units 106 are located above the pixel array in a direction perpendicular to the first substrate 100. In FIG. 3, in order to show the pixel array clearly, the electrode unit 106 is indicated by a dashed box. FIG. 3 shows two electrode units 106, but the number of the electrode units 106 is not limited in the present disclosure.

It should also be noted that, in the embodiment as shown in FIG. 3, each of the pixel units 104 on the first substrate 100 includes a thin film transistor. In each of the pixel units 104, the thin film transistor is connected to the data line 101 and the scanning line 103. Therefore, in pixel units on both sides of the first non-display area 201, the thin film transistors are both disposed close to the first non-display area 201.

In the embodiment, a touch display chip 105 is further disposed on the first substrate 100, and each of the data lines 101 is connected to the touch display chip 105, the touch display chip 105 is for providing display signals to the data lines 101.

Figure 4:
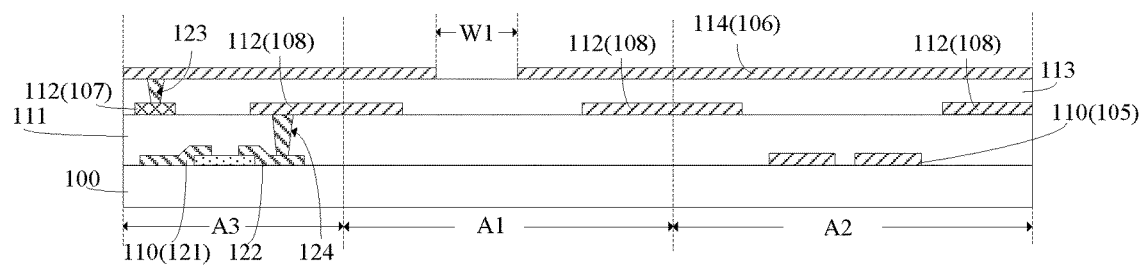
FIG. 4 is a sectional view of the array substrate as shown in FIG. 3.

FIG. 4 is a sectional view of the array substrate as shown in FIG. 3. It should be noted that, in order to show relationships among different film layers at different positions clearly, FIG. 4 includes three parts. A first part A1 is a sectional view of the array substrate along a line CC' in FIG. 3, and the sectional view includes the gap W1 between two electrode units 106. A second part A2 is a sectional view of the array substrate along a line DD' in FIG. 3, and the sectional view includes one first non-display area 201. A third part A3 schematically shows the structure of the pixel unit in FIG. 3.

With reference to FIG. 4 in conjunction with FIG. 3, a first conducting layer 110, a first insulating layer 111, a second conducting layer 112, a second insulating layer 113 and a third conducting layer 114 are stacked sequentially on the first substrate 100.

Multiple drains 122, multiple sources 121 and the data lines 105 are disposed in the first conducting layer 110. The drains 122 and the sources 121 are used to form thin film transistors. It should be noted that, in the embodiment, gates and a gate insulating layer are further disposed between the first conducting layer 110 and the first substrate 100, and the gates and the gate insulating layer are conventional structures for forming the thin film transistors and accordingly they are not shown in FIG. 4.

Multiple first via holes 124 are disposed in the first insulating layer 111, where the first via holes 124 each pass through the first insulating layer 111.

Multiple pixel electrodes 108 are disposed in the second conducting layer 112, and each of the pixel electrodes 108 is electrically connected to one drain 122 through the first via hole 124. It should be noted that, the third part A3 of FIG. 4 merely shows the structure of one pixel unit, and consequently, FIG. 4 merely shows one drain 121, one source 122 and one pixel electrode 108.

In other embodiments, the array substrate further includes multiple touch electrode leads 107 (not shown in FIG. 4) located above the first substrate 100, and each of the electrode units 106 is electrically connected to one touch electrode lead 107. However, in the depicted embodiment in FIG. 4, the touch electrode leads 107 are located in the second conducting layer 112.

The electrode units 106 are located in the third conducting layer 114. Multiple fourth via holes 123 are disposed in the second insulating layer 113, where the fourth via holes 123 each pass through the second insulating layer 113; and the touch electrode leads 107 are electrically connected to the electrode units 106 through the fourth via holes 123 passing through the second insulating layer 113. The electrode units 106 and the pixel electrodes 108 are located in different layers in the embodiment. The array substrate in the embodiment is an array substrate in an FFS display mode, but a display mode of the array substrate is not limited in the present disclosure.

Reference is made to the first part A1 in FIG. 4 in conjunction with FIG. 3, the gap W1 between two electrode units 106 adjacent in the first direction is located above the second non-display area 202 as shown in the first part A1 of FIG. 4. There is no data line 105 arranged in the second non-display area 202 below the gap W1, and no lateral electric field may be generated due to the electrode units 106 on both sides of the gap W1 and the data lines 15. Therefore, in the case that the array substrate is applied to a liquid crystal display panel, liquid crystal molecules at the area of the gap W1 between two adjacent electrode units 106 may not be driven by any lateral electric field to rotate, thereby avoiding light leakage.

Reference is made to the second part A2 in FIG. 4 in conjunction with FIG. 3, the data lines 15 are disposed in the first non-display area 201, and the gap between the electrode units 106 is not located above the first non-display area 201. Therefore, no lateral electric field may be generated above the electrode unit 106 by the data lines 105 and the electrode unit 106, thereby avoiding light leakage due to the lateral electric field.

It should be noted that, in the embodiment, since no lateral electric field may be generated by the electrode units 106 on both sides of the gap W1 and the data lines 105, the slit W1 may be wider, in the first direction, than a gap between two adjacent electrode units in the conventional array substrate. Optionally, the width of the gap W1 in the first direction may range from 3 microns to 7 microns, so that short circuit is effectively prevented from occurring between two adjacent electrode units 106, thereby reducing mutual interference between two adjacent electrode units 106 in the touch sensing phase and improving touch sensing accuracy.

Figure 5:
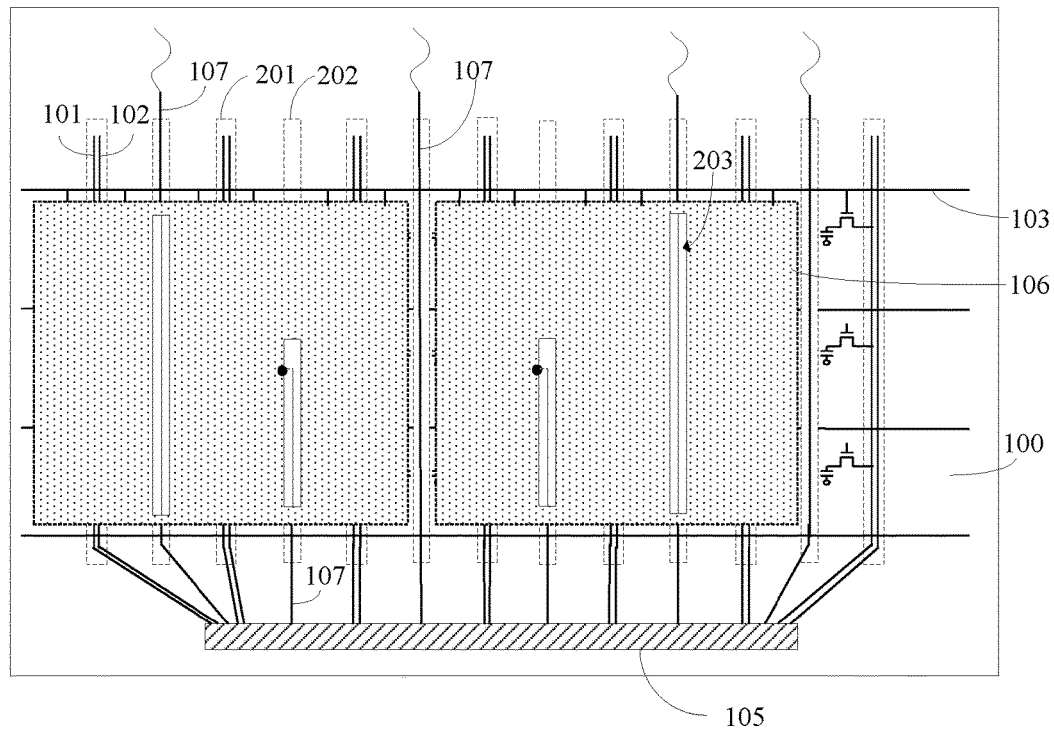
FIG. 5 is a diagram showing a position relationship between touch electrode leads and electrode units in the array substrate as shown in FIG. 3.

Reference is made to FIG. 5, which shows a position relation between the touch electrode leads 107 and the electrode units 106 in the array substrate according to an embodiment. The electrode units 106 are indicated by blocks filled by dots.

In the embodiment, the electrode units 106 are electrically connected to a touch sensing chip via the touch electrode leads 107. In the embodiment, the touch sensing chip, i.e., the touch display chip 105 provides touch signals for the touch electrode leads 107. That is, the touch display chip 105 may provide the display signals and the touch signals, but the present disclosure is not limited in this aspect. In other embodiments, two chips may be disposed for providing the display signals and the touch signals respectively.

Reference is still made to FIG. 5, each of the electrode units 106 includes at least one slit 203. The slit 203 is located above a part of the second non-display area 202, and at least a part of the touch electrode lead 107 is exposed through the slit 203. An area in the electrode unit 106 corresponding to the touch electrode lead 107 mainly includes the slit 203, therefore, in the case that the touch signal is applied to the touch electrode lead 107, the touch signal affects the electrode unit 106 little, and accordingly, touch sensing becomes more accurate. As shown in FIG. 5, through the slit 203 in one electrode unit 106, the touch electrode lead 107 electrically connected to the one electrode unit 106 may be exposed, or a touch electrode lead 107 electrically connected to another electrode unit 106 and passing through the area of the one electrode unit 106 may be exposed.

It should be noted that, in the embodiment, the touch electrode lead 107 is merely located in a part of the second non-display area 202, in another part of the second non-display area 202, the array substrate further includes a strip-shaped metal structure (not shown in FIG. 5). The strip-shaped metal structure is located in the same layer with the data lines 101, and the strip-shaped metal structure is electrically connected to the electrode unit 106. Different from the touch electrode lead 107, the strip-shaped metal structure is floated. With the strip-shaped metal structure, load of the electrode unit 106 in the touch sensing phase can be increased, and accuracy of touch sensing can be improved.

Figure 6:
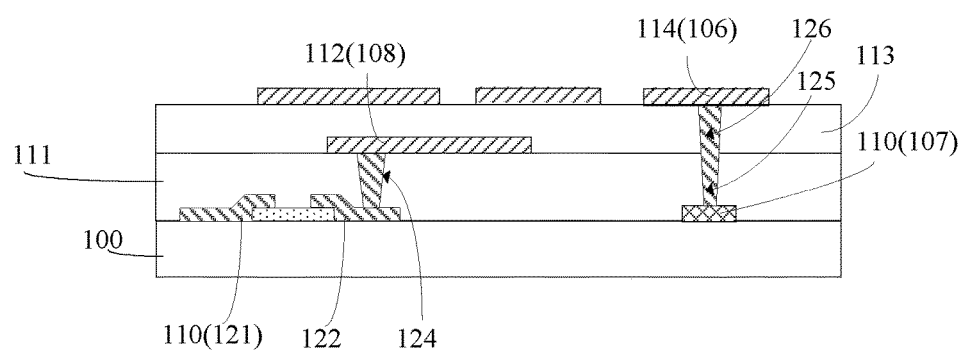
FIG. 6 is a schematic structural diagram of a pixel unit of another array substrate according to the present disclosure.

Reference is made to FIG. 6, which shows a schematic structural diagram of a pixel unit of an array substrate according to another embodiment of the present disclosure. The embodiment is substantially the same as the above embodiment, and the same part as the above embodiment is not described here. The embodiment differs from the above embodiment as follows.

In the embodiment, the touch electrode lead 107 and the data line (not shown in FIG. 6) are each located in the first conducting layer 110, and the touch electrode lead is formed simultaneously with the data line.

A second via hole 125 is disposed in the first insulating layer 111, where the second via hole 125 passes through the first insulating layer 111; a third via hole 126 is disposed in the second insulating layer 113, where the third via hole 126 passes through the second insulating layer 113. The third via hole 126 is disposed corresponding to the second via hole 125, and the touch electrode lead 107 is electrically connected to the electrode unit 106 through the second via hole 125 and the third via hole 126.

Compared with the other embodiments, the depicted embodiment in FIG. 6 implements the touch electrode lead 107 and the data line in the same layer; since both the touch electrode lead 107 and the data line 105 are made of metal, the touch electrode lead 107 and the data line 105 may be formed simultaneously through one time of metal deposition and one time of lithography. Hence, the time of lithography is reduced by one when compared with a fabricating method according to the above embodiments, thereby improving a fabricating speed of the array substrate and reducing cost efficiently.

Figure 7:
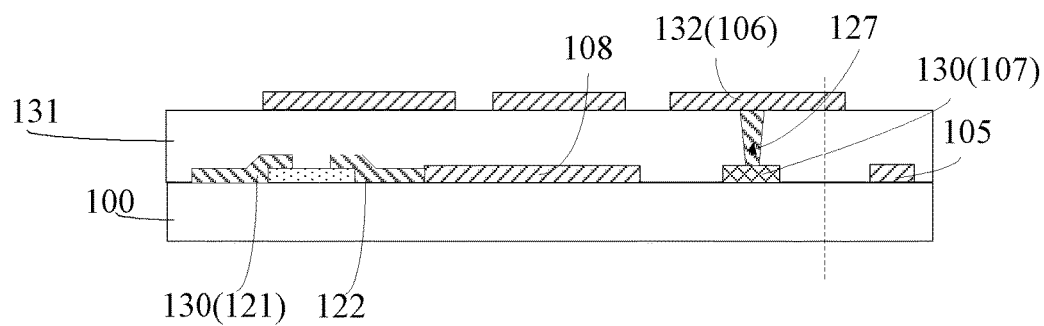
FIG. 7 is a schematic structural diagram of a pixel unit of still another array substrate and a periphery of the pixel unit according to the present disclosure.

Reference is made to FIG. 7, which shows a schematic structural diagram of a pixel unit of an array substrate and a periphery of the pixel unit according to an embodiment of the present disclosure. In FIG. 7, a left side of a dotted line schematically shows the structure of the pixel unit, a right side of the dotted line schematically shows the structure of a part of the first non-display area. The array substrate according to the embodiment is substantially the same as the array substrate as shown in FIG. 3, and the same part as the array substrate as shown in FIG. 3 is not described here. The array substrate according to the embodiment differs from the array substrate as shown in FIG. 3 in that, structures in a direction perpendicular to the first substrate 100 are different. Therefore, a top view of the array substrate according to the embodiment may be understood with reference to FIG. 3.

Reference is made to FIG. 7, the array substrate according to the embodiment differs from the array substrate as shown in FIG. 3 as follows.

A fourth conducting layer 130, a fourth insulating layer 131 and a fifth conducting layer 132 are stacked sequentially on the first substrate 100.

Multiple drains 122, multiple sources 121 and the data lines 105 are disposed in the fourth conducting layer 130.

Multiple pixel electrodes 108 arranged in an array are disposed in the fourth conducting layer 130, and each of the pixel electrodes 108 is connected to one drain 122 which is located in the same layer with the pixel electrode 108. It should be noted that, FIG. 7 merely shows the structure of one pixel unit, and hence FIG. 7 merely shows one drain 121, one source 122 and one pixel electrode 108.

The electrode unit 106 is located in the fifth conducting layer 132.

In the embodiment, the touch electrode lead 107 is located in the fourth conducting layer 130 and is formed simultaneously with the data line 105.

A fifth via hole 127 is disposed in the fourth insulating layer 131, where the fifth via hole 127 passes through the fourth insulating layer 131, and the touch electrode lead 107 is electrically connected to the electrode unit 106 through the fifth via hole 127.

In the embodiment, the pixel electrode 108 and the drain 122 are located in the same layer. Therefore, compared with the above embodiments, the number of conducting layer and the number of insulating layer each are reduced by one in the array substrate according to the embodiment, thereby further reducing a production cost and improving a production efficiency.

A method for fabricating an array substrate is further provided according to the present disclosure. The fabricating method may be used for fabricating the array substrate according to the present disclosure or other array substrates.

Figure 8:
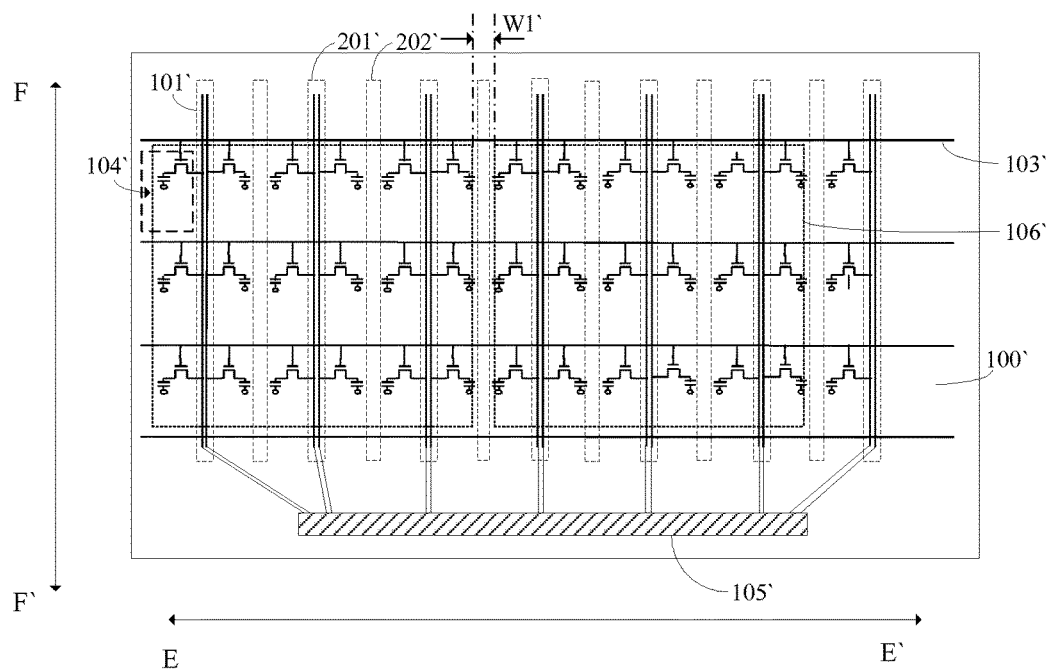
FIG. 8 is a schematic diagram of a method for fabricating an array substrate according to the present disclosure.

Reference is made to FIG. 8, which shows a schematic diagram of a method for fabricating an array substrate according to an embodiment of the present disclosure. The method for fabricating the array substrate in the embodiment may be used for fabricating the array substrate according to the present disclosure.

The method includes the following steps:

providing a first substrate 100'; and forming a pixel array, multiple scanning lines 103' each extended in a first direction (in a direction along a line EE' in FIG. 8), multiple data lines 101' each extended in a second direction (in a direction along a line FF' in FIG. 8) and a common electrode layer on the first substrate 100', where the pixel array includes multiple pixel units 104' arranged in an array, the scanning lines 103' and the data lines 101' are used to drive the multiple pixel units 104'; the area between two adjacent columns of the pixel units 104' is defined as a first non-display area 201' or a second non-display area 202', and the first non-display areas 201' and the second non-display areas 202' are arranged alternately in the first direction.

Specifically, in a process of forming the multiple data lines 101', multiple data lines 101' are formed in multiple pairs on the first substrate 100' and the data lines in each pair are adjacent to each other. After the pixel array, the scanning lines 103' and the data lines 101' are formed, the data lines 101' are disposed in the first non-display areas 201'; each of the first non-display areas 201' includes two adjacent data lines 101', the two adjacent data lines 101' are respectively electrically connected to two columns of pixel units 104' on two sides of the first non-display area 201' where the two adjacent data lines are located.

The common electrode layer is disposed opposite to the pixel array. The common electrode layer includes multiple electrode units 106' arranged in an array, the electrode units 106' function as touch sensing electrodes in a touch sensing phase and function as common electrodes of the pixel units in a display phase. A gap W1' is provided between two electrode units 106' adjacent in the first direction, and the gap W1' is located above a part of the second non-display area 202'.

In an array substrate fabricated with the fabricating method according to the embodiment, since the data lines 101' are disposed in the first non-display areas 201' and the gap between the electrode units is not located above the first non-display area 201', no lateral electric field may be generated above the electrode unit 106' by the data lines 101' and the electrode unit 106', thereby avoiding light leakage due to the lateral electric field. There is no data line 101' in the second non-display area 202' below the gap between two adjacent electrode units 106', therefore, in the case the array substrate fabricated by the fabricating method is applied to a liquid crystal display panel, liquid crystal molecules at the gap W1' between two adjacent electrode units 106 may not be driven by any lateral electric field to rotate, and light leakage is accordingly avoided.

Figure 9:
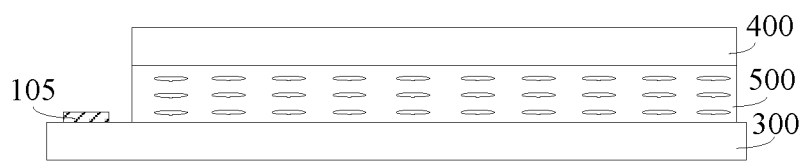
FIG. 9 is a schematic structural diagram of a display apparatus according to the present disclosure.

A display apparatus is further provided according to an embodiment of the present disclosure. Reference is made to FIG. 9, which shows a schematic diagram of a display apparatus according to the present disclosure. The display apparatus according to the embodiment includes the array substrate 300 provided according to the present disclosure and a cover plate 400 disposed opposite to the array substrate.

Specifically, the array substrate 300 according to the embodiment is a first type of array substrate provided in the present disclosure; therefore, a specific structure of the array substrate 300 may be understood with reference to FIG. 3 and FIG. 4.

In the embodiment, the cover plate 400 is a color filter.

The display apparatus further includes: a liquid crystal layer 500 located between the array substrate 300 and the color filter 400; and a touch sensing chip located on the array substrate 300. In the embodiment, the touch sensing chip is the touch sensing chip 105 in FIG. 3.

As described in the embodiment of the first type of array substrate in the present disclosure, in the array substrate 300 in the present disclosure, since the data lines are disposed in the first non-display areas and the gap between the electrode units is not located above the first non-display area, no lateral electric field may be generated above the electrode unit by the data lines and the electrode units, thereby avoiding light leakage due to the lateral electric field and obtaining a better display effect when using the display apparatus according to the present disclosure over the conventional art.

Although the embodiments of the present disclosure are disclosed above, the present disclosure is not limited thereto. Various changes and modifications can be made by those skilled in the art without departing from the spirit and scope of the present disclosure. Therefore, the scope of protection of the present disclosure should be based on a scope defined by the appended claims.

What is claimed is:

1. An array substrate, comprising:
a first substrate;
a pixel array located on the first substrate, wherein the pixel array comprises a plurality of pixel units arranged in an array of rows and columns;
a plurality of scanning lines each extended in a first direction and a plurality of data lines each extended in a second direction, wherein the scanning lines and the data lines are configured to drive the plurality of pixel units;
a plurality of first non-display areas and a plurality of second non-display areas, wherein one of the plurality of first non-display areas or one of the plurality of second non-display areas is located between two adjacent columns of the pixel units, wherein the plurality of first non-display areas and the plurality of second non-display areas are arranged alternately in the first direction, wherein two data lines are disposed in at least one of the first non-display areas, and are respectively electrically connected to two columns of pixel units on two sides of the first non-display area where the two data lines are located;
a common electrode layer disposed over the pixel array, wherein the common electrode layer comprises a plurality of common electrode blocks arranged in an array, the plurality of common electrode blocks functions as touch sensing electrodes in a touch sensing phase and functions as common electrodes of the pixel units in a display phase; and
a plurality of touch electrode leads located on the first substrate, wherein each of the common electrode blocks is electrically connected to one of the plurality of touch electrode leads;

wherein the plurality of common electrode blocks each comprises at least one slit, the at least one slit is located above a part of the second non-display area, and at least a part of one of the plurality of the touch electrode lead is exposed through the at least one slit;

wherein the plurality of common electrode blocks is arranged to have a gap between two adjacent common electrode blocks along the first direction, wherein the gap is located above a part of the second non-display area, and wherein there is no data line disposed in the plurality of second non-display areas below the gap.

2. The array substrate according to claim 1, wherein a width of the gap in the first direction ranges from 3 microns to 7 microns.

3. The array substrate according to claim 1, wherein the common electrode layer is disposed on a side of the pixel array, the side being away from the first substrate.

4. The array substrate according to claim 1, wherein the plurality of common electrode blocks is electrically connected to a touch sensing chip via the plurality of touch electrode leads.

5. The array substrate according to claim 1, wherein a first conducting layer, a first insulating layer, a second conducting layer, a second insulating layer and a third conducting layer are stacked sequentially on the first substrate;

wherein a plurality of drains, a plurality of sources and the plurality of data lines is disposed in the first conducting layer;

wherein a plurality of first via holes is disposed in the first insulating layer, wherein the first via holes each passes through the first insulating layer;

wherein the pixel electrodes are disposed in the second conducting layer, wherein each of the pixel electrodes is electrically connected to one of the plurality of drains through one of the plurality of the first via holes; and wherein the plurality of common electrode blocks is located in the third conducting layer.

6. The array substrate according to claim 5, wherein the plurality of touch electrode leads is located in the first conducting layer and formed simultaneously with the plurality of data lines;

wherein a plurality of second via holes is disposed in the first insulating layer, wherein the plurality of second via holes each passes through the first insulating layer;

wherein a plurality of third via holes is disposed in the second insulating layer, and wherein the plurality of third via holes each passes through the second insulating layer and is aligned with one of the plurality of second via holes; and wherein the plurality of touch electrode leads each is electrically connected to one of the plurality of common electrode blocks through one of the plurality of second via holes and one of the plurality of third via holes aligned to each other.

7. The array substrate according to claim 5, wherein the plurality of touch electrode leads are located in the second conducting layer;

wherein a plurality of fourth via holes are disposed in the second insulating layer, wherein the plurality of fourth via holes each passes through the second insulating layer; and wherein the plurality of touch electrode leads is electrically connected to the plurality of common electrode blocks through the plurality of fourth via holes.

8. The array substrate according to claim 1, wherein a fourth conducting layer, a fourth insulating layer, and a fifth conducting layer are stacked sequentially on the first substrate;

wherein a plurality of drains, a plurality of sources and the plurality of data lines are disposed in the fourth conducting layer;

wherein a plurality of pixel electrodes arranged in an array is disposed in the fourth conducting layer, wherein each of the pixel electrodes is connected to one of the plurality of drains located in the same layer; and the plurality of common electrode blocks is located in the fifth conducting layer.

9. The array substrate according to claim 8, wherein the plurality of touch electrode leads is located in the fourth conducting layer and formed simultaneously with the plurality of data lines;

wherein a plurality of fifth via holes is disposed in the fourth insulating layer, wherein the plurality of fifth via holes each passes through the fourth insulating layer; and wherein the plurality of touch electrode leads is electrically connected to the plurality of common electrode blocks through the plurality of fifth via holes.

10. The array substrate according to claim 1, further comprising a plurality of strip-shaped metal structures, wherein each of the plurality of strip-shaped metal structures is located in one of the plurality of second non-display areas in the same layer with the plurality of data lines, and the plurality of strip-shaped metal structures are electrically connected to the plurality of common electrode blocks.

11. A method for fabricating an array substrate, comprising:

providing a first substrate;

forming, on the first substrate, a pixel array, a plurality of scanning lines each extended in a first direction, a plurality of data lines each extended in a second direction; wherein the pixel array comprises a plurality of pixel units arranged in an array of rows and columns, wherein the plurality of scanning lines and the plurality of data lines are configured to drive the plurality of pixel units;

arranging alternately in pairs one of a plurality of first non-display areas and one of a plurality of second non-display areas in between adjacent columns of the plurality of pixel units in the first direction;

arranging two data lines of the plurality of data lines in at least one of the plurality of first non-display areas, respectively connected to two columns of pixel units on two sides of the first non-display area where the two data lines are located;

disposing a common electrode layer comprises a plurality of common electrode blocks over the pixel array, wherein the plurality of common electrode blocks each comprises at least one slit, the at least one slit is located above a part of the second non-display area, and at least a part of one of the plurality of the touch electrode leads is exposed through the at least one slit; and arranging a plurality of touch electrode leads on the first substrate, wherein each of the plurality of common electrode blocks is electrically connected to one of the plurality of touch electrode leads;

wherein the plurality of common electrode blocks is arranged in an array, functions as touch sensing electrodes in a touch sensing phase and functions as common electrodes of the pixel units in a display phase; and wherein the plurality of common electrode blocks is arranged to have a gap between two adjacent common electrode blocks along the first direction, wherein the gap overlays one second non-display area, wherein there is no data line disposed in the plurality of second non-display areas below the gap.

12. A display apparatus, comprising:
an array substrate; and
a cover plate disposed opposite to the array substrate;
wherein the array substrate comprises:
a first substrate;
a pixel array located on the first substrate, wherein the pixel array comprises a plurality of pixel units arranged in an array of rows and columns;
a plurality of scanning lines each extended in a first direction and a plurality of data lines each extended in a second direction, wherein the scanning lines and the data lines are configured to drive the plurality of pixel units;
a plurality of first non-display areas and a plurality of second non-display areas, wherein one of the plurality of first non-display areas or one of the plurality of second non-display areas is located between two adjacent columns of the pixel units, wherein the plurality of first non-display areas and the plurality of second non-display areas are arranged alternately in the first direction, wherein two data lines are disposed in at least one of the first non-display areas, and are respectively electrically connected to two columns of pixel units on two sides of the first non-display area where the two data lines are located;

a common electrode layer disposed over the pixel array, wherein the common electrode layer comprises a plurality of common electrode blocks arranged in an array, the plurality of common electrode blocks functions as touch sensing electrodes in a touch sensing phase and functions as common electrodes of the pixel units in a display phase; and a plurality of touch electrode leads located on the first substrate, wherein each of the common electrode blocks is electrically connected to one of the plurality of touch electrode leads;

wherein the plurality of common electrode blocks each comprises at least one slit, the at least one slit is located above a part of the second non-display area, and at least a part of one of the plurality of the touch electrode lead is exposed through the at least one slit;

wherein the plurality of common electrode blocks is arranged to have a gap between two adjacent common electrode blocks along the first direction, wherein the gap is located above a part of the second non-display area, and wherein there is no data line disposed in the plurality of second non-display areas below the gap.

13. The display apparatus according to claim 12, wherein the cover plate is a color filter; and the display apparatus further comprises: a liquid crystal layer located between the array substrate and the color filter, and a touch sensing chip located on the array substrate.

* * * * *